United States Patent [19]

Tumey et al.

[11] Patent Number: 5,651,295

[45] Date of Patent: Jul. 29, 1997

[54] METHOD OF MACHINING OF ALUMINUM

[75] Inventors: Russell J. Tumey, Toledo, Ohio;
Robert L. De Corte, Flat Rock, Mich.;
Donald R. Hart, Johnson City, Tenn.;
Alvin J. Lang, Garfield Heights, Ohio

[73] Assignees: Kennametal Inc., Latrobe, Pa.;
General Motors Corportion, Detroit, Mich.

[21] Appl. No.: 633,604

[22] Filed: Apr. 17, 1996

Related U.S. Application Data

[63] Continuation of Ser. No. 38,321, Mar. 29, 1993, abandoned.

[51] Int. Cl.$^6$ .................. B23B 1/00; B23B 5/48
[52] U.S. Cl. ................................................ 82/1.11
[58] Field of Search ................... 82/1.11; 407/117, 407/119

[56] References Cited

U.S. PATENT DOCUMENTS

| | | | |
|---|---|---|---|
| 4,610,581 | 9/1986 | Heinlein | 407/54 |
| 4,643,620 | 2/1987 | Fujii et al. | 407/119 |
| 4,704,055 | 11/1987 | Guhring | 408/59 |
| 4,708,037 | 11/1987 | Buljan et al. | 82/1.11 |
| 4,834,592 | 5/1989 | Niebauer et al. | 407/114 |
| 4,957,396 | 9/1990 | Niebauer | 407/114 |
| 4,963,060 | 10/1990 | Niebauer et al. | 407/114 |
| 5,032,050 | 7/1991 | Niebauer et al. | 407/114 |
| 5,037,249 | 8/1991 | Niebauer et al. | 407/114 |
| 5,075,181 | 12/1991 | Quinto et al. | 428/698 |
| 5,088,862 | 2/1992 | Niebauer et al. | 407/114 |
| 5,106,674 | 4/1992 | Okada et al. | 428/217 |
| 5,216,845 | 6/1993 | Buljan et al. | 82/1.11 |
| 5,250,367 | 10/1993 | Santhanam et al. | 428/698 |

OTHER PUBLICATIONS

Metals handbook Ninth Edition, vol. 16, Machining (1989) pp. 761–804.
Metals Handbook, vol. 2, 10th Edition, ASM International (1990) pp. 15–28.
"Kennametal, Tools, Tooling Systems, Services for the Global Metalworking Industry," Kennametal Inc. (1991) pp. 1, 2, 275, 276, 333–338, and 391–396.

*Primary Examiner*—Daniel W. Howell
*Assistant Examiner*—Kenneth J. Hansen
*Attorney, Agent, or Firm*—John J. Prizzi

[57] ABSTRACT

Machining of internal and external grooves in aluminum based alloys is performed through the use of a sharp edge physical vapor deposition coated cemented carbide cutting tool.

5 Claims, 2 Drawing Sheets

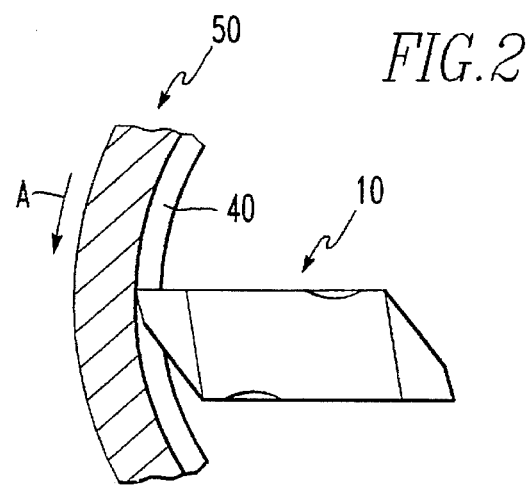
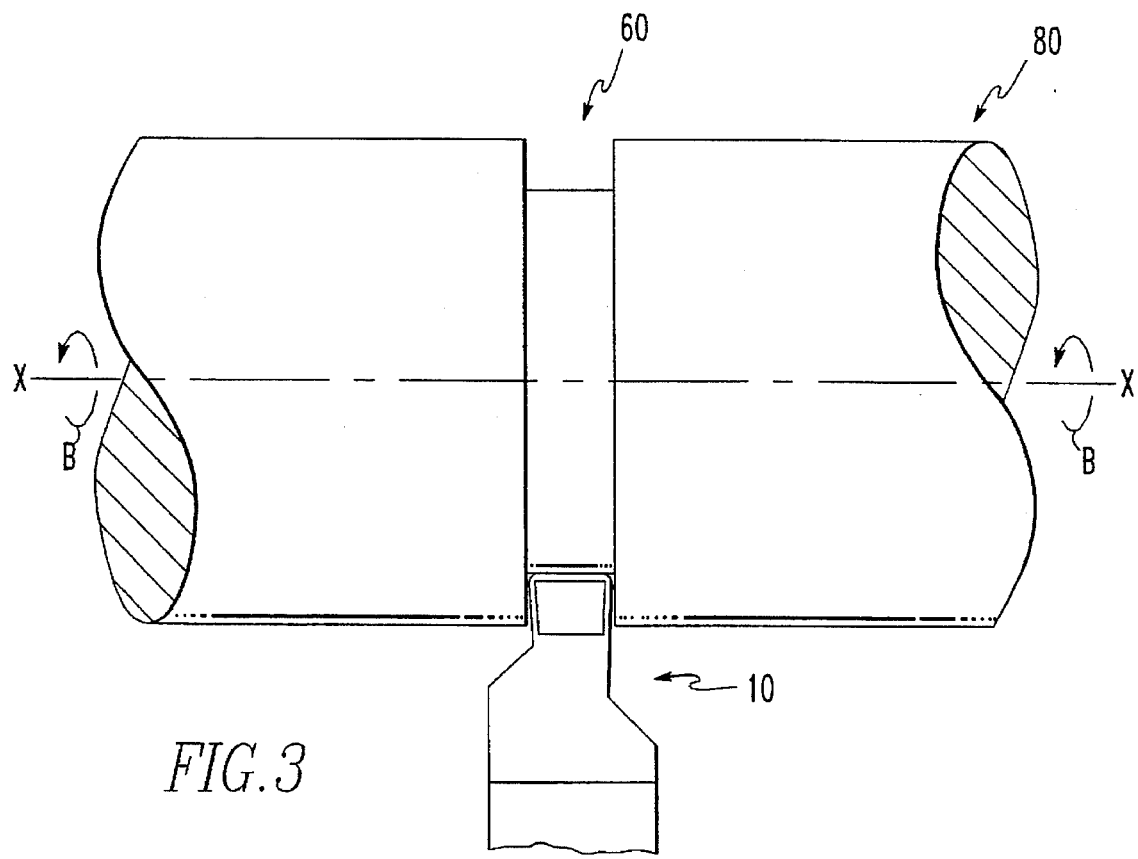

METHOD OF MACHINING OF ALUMINUM

This application is a continuation of application Ser. No. 08/038,321 filed on Mar. 29, 1993, now abandoned.

BACKGROUND OF THE INVENTION

The present invention relates to methods of machining aluminum. It especially relates to methods of machining internal and external grooves and threads in aluminum.

While a variety of tool materials, such as physical vapor deposition TiN coated cemented carbides (e.g., KC730) and diamond tipped tools (e.g., KD100), have been used in the past to machine certain aluminum based alloys, diamond tipped tools are regarded as being the best in terms of tool lifetime and parts machined per cutting edge. In particular, for machining high silicon aluminum alloys, such as the 3xx.x and 4xx.x series of cast aluminum alloys, and the 4xxx wrought aluminum alloys (see "Metals Handbook," Volume 2, 10th Edition, ASM International (1990), Pages 15–28), only diamond tipped tools, such as KD100, are recommended for machining grooves or threads in these materials (see "Kennametal, Tools, Tooling Systems, Services for the Global Metalworking Industry," Kennametal Inc. (1991), Pages 275, 276, 372 and 392–396). KC730 and KD100 are trademarks of Kennametal Inc. and are used as such herein. An example of cast high silicon aluminum alloys are the 380 type alloys which typically have about 7.5 to 9.5 weight percent silicon in addition to other alloying elements.

A polycrystalline diamond tipped tool was used to machine an inside diameter oil seal groove (having a width of 2.73 mm) in an automobile transmission component, a piston made of cast 380 aluminum alloy. The polycrystalline diamond grooving tool made the approximately 3 to 5 mm deep plunge cut for the groove at a feed rate of 0.076 mm/revolution and a speed of 1628 revolutions per minute (i.e., at about 950 to 1110 surface feet per minute), using flood coolant. The inside diameter at the location of the groove went from an original diameter of about 56.6 to 59.9 mm to about 66.1 mm after the groove was machined. During the cut, however, an extremely thin, practically invisible chip, almost like cellophane, would weld itself to 20 to 90 degrees of the bottom circumference of the groove, which was unacceptable.

BRIEF SUMMARY OF THE INVENTION

To solve the aforementioned problem, the present inventors first investigated the possibility of adding an integral chip control structure to the diamond tipped insert. When they found that this was not practical, they surprisingly discovered the present invention.

In the present invention, aluminum based alloys, especially high silicon aluminum based alloys having 3 to less than 13 weight percent silicon, and preferably 3 to less than 10 weight percent silicon, are machined by a process involving the steps of cutting into the aluminum based alloy to form a groove therein at a high speed (at least 200 surface feet per minute, but preferably less than 2000 surface per minute) with a sharp edge, physical vapor deposition coated cemented carbide cutting tool to form aluminum based chips. This process may be used to form a groove (or threads) in the inside diameter surface of a hollow member, or in an external surface (e.g., an external diameter groove, or a face groove).

It has been surprisingly found that, in this process, the sharp edge physical vapor deposition coated cemented carbide cutting tool has a cutting edge lifetime of at least twice, and, frequently, three times, that of a diamond tipped cutting tool.

These and other aspects of the present invention will become more apparent upon review of the detailed description of the invention in conjunction with the drawings which are briefly described below.

BRIEF DESCRIPTION OF THE DRAWINGS

FIG. 2 shows a cutting insert being used in an embodiment of the process according to the present invention to provide an internal groove in a workpiece.

FIG. 3 shows a cutting insert being used in another embodiment of the process according to the present invention to provide an external groove in a workpiece.

DETAILED DESCRIPTION OF THE INVENTION

Figure 1:
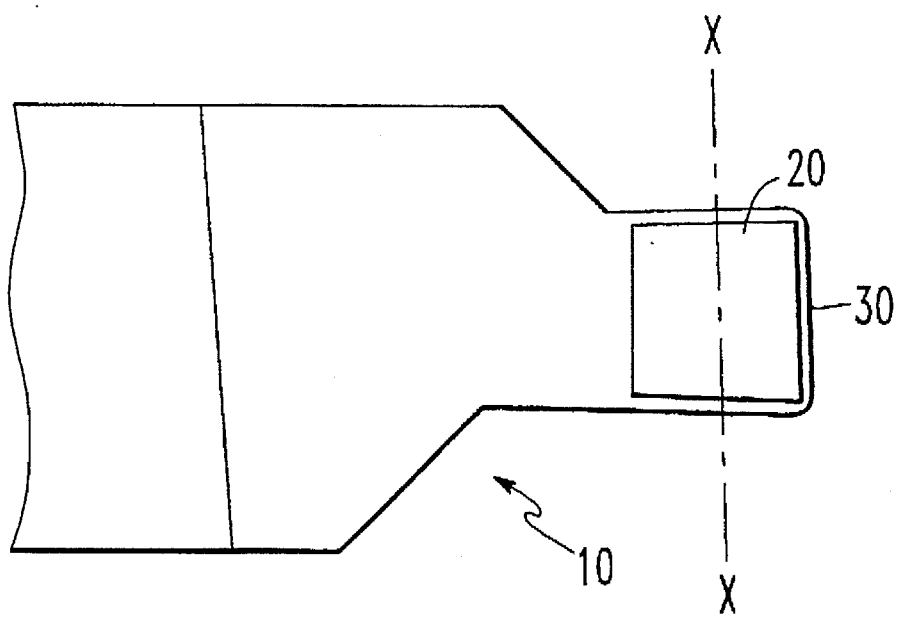
FIG. 1 shows a partial top plan view of an embodiment of the cutting insert used in the process according to the present invention.

When the present inventors found that adding chip control to a diamond tipped insert was not practical, they decided to try a tungsten carbide-cobalt based cemented carbide grooving insert 10 with an integral chip control structure ground in. Accordingly, a chip control groove 20 was designed and ground into blank version of Kennametal's Top Notch grooving inserts (see U.S. Pat. Nos. 4,957,396; 4,834,592, 4,963,060; 5,032,050; 5,037,249; 5,088,862 and the aforementioned 1991 Kennametal Catalogue pages 333–338). The groove, preferably, has a maximum depth of 0.127 mm (0.005 inch) and begins about 0.127 mm (0.005 inch) behind the cutting edge 30. The cutting edge 30 has a width of 2.73 mm (0.1075 inches). The groove 20, preferably, has a concave cylindrical surface whose center line x—x is parallel to the cutting edge and, preferably, has a radius of curvature of 4.0 mm (0.156 inch). The cutting insert 10 is also, preferably, polished, preferably with a 400 grit wheel, to enhance the ability of the tool to produce a groove meeting micro-finish requirements.

A hard physical vapor deposition coating is then applied by way of PVD (physical vapor deposition) process. Preferably, a titanium nitride coating is used, but other commercially available PVD coating compositions may also be used (see, for example, U.S. Pat. No. 5,075,181). PVD coating, because it is performed at relatively low temperatures, has no deleterious effects on the cemented carbide insert substrate and, thereby, permits coating of sharp (unhoned) insert cutting edges. A sharp cutting edge reduces cutting forces while improving workpiece surface finish. It was believed that reducing cutting forces might be one of the keys to solving the aluminum grooving problem described above.

The inventors hoped that the above-described PVD coated cutting insert, with an integral chip control structure, would solve the aluminum chip control problem described above. It was, however, expected that tool life would be significantly reduced, compared with the diamond tipped tool, but it was hoped that this reduced tool life would be compensated for by the benefits of improved chip control.

In tests conducted under the same cutting conditions as were used with the diamond tipped insert, these sharp edge PVD coated inserts of the KC730 grade (i.e., about 1.5 to 5 μm of PVD TiN coating on a 6 weight percent cobalt—0.4 weight percent chromium—cemented tungsten carbide substrate) provided excellent chip control and the inside diameter grooves they produced in the aluminum 380 alloy casting were clean and ready to receive seal rings. FIG. 2 shows a cutting insert 10 being used in accordance with the present invention to machine an inside diameter groove 40 in a high silicon aluminum alloy workpiece 50 shown in cross section and rotating in direction A.

In addition, the tool life of the PVD coated sharp edge cemented carbide insert was surprisingly and unexpectedly improved compared with the diamond tipped insert previously used in this application. Previously, the diamond tipped insert typically cut about 12,000 grooves before edge wear made replacement necessary. The PVD coated carbide tool, expected to exhibit lower tool life, instead machined 40,000 grooves for each of the two cutting edges of the insert, for a total of 80,000 pieces per insert.

The cost of the PVD coated cemented carbide insert was less than 14 percent of the diamond tipped tool. The extended tool life of the PVD coated cemented carbide tool resulted in a cutting insert cost per groove machined of less than five percent of the cost with the diamond tipped tool.

While the unexpected and surprising results of the present invention have been demonstrated in an inside diameter grooving process, it is expected that this machining process can also be applied to external groove machining. FIG. 3 illustrates the use of a cutting insert 10 to machine an external groove 60 in the outside diameter surface of a high silicon aluminum alloy workpiece 80 rotating about axis x—x in direction B. In external groove machining, since chip control is not as great a problem as it is in inside diameter groove machining, the PVD coated, sharp edged cutting insert may not need to have an integral chip control structure. It is also believed that this machining process may also be applied in the internal and external threading of high silicon aluminum based alloys.

The documents and patents referred to herein are hereby incorporated by reference.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A process of chip forming machining of a 380 cast aluminum alloy having 7.5 to 9.5 weight percent silicon in a turning operation comprising the step of:

cutting into an inside diameter surface of a hollow member composed of said cast aluminum alloy to form an internal circumferential groove therein using a sharp edged physical vapor deposition titanium nitride coated and polished cemented carbide grooving insert having an integral chipbreaker groove;

and wherein said cutting is performed under cutting conditions including a predetermined feed rate and a predetermined speed with flood coolant, wherein said cutting conditions are selected to provide said cemented carbide insert with a cutting edge lifetime of at least twice that of a polycrystalline diamond tipped insert under identical cutting conditions;

and wherein said speed is between 950 and 2,000 surface feet per minute.

2. The process according to claim 1 wherein said hollow member is an automobile transmission piston and said internal circumferential groove is an oil seal groove.

3. The process according to claim 2, wherein said speed is 950 to 1,110 surface feet per minute.

4. The process according to claim 1 wherein said sharp edge, physical vapor deposition coated cemented carbide insert has a cutting edge lifetime of at least three times that of the polycrystalline diamond tipped insert under identical cutting conditions.

5. The process according to claim 1 wherein said speed is 950 to 1110 surface feet per minute.

* * * * *